July 27, 1965  H. S. HILTON  3,196,712
POWER DRIVE ATTACHMENT FOR FLUID CONTROL VALVES
Filed March 29, 1963
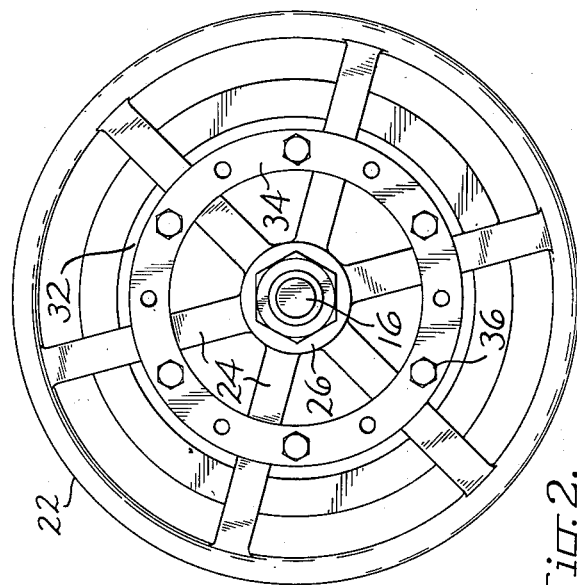
Fig. 2.
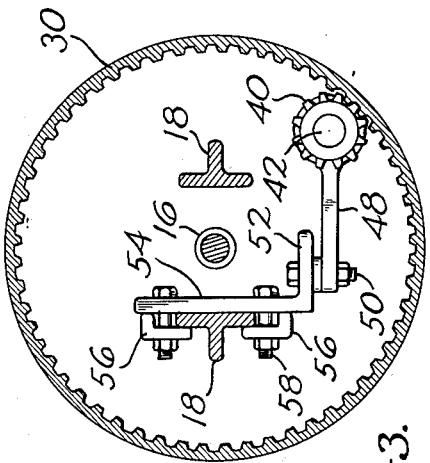
Fig. 3.
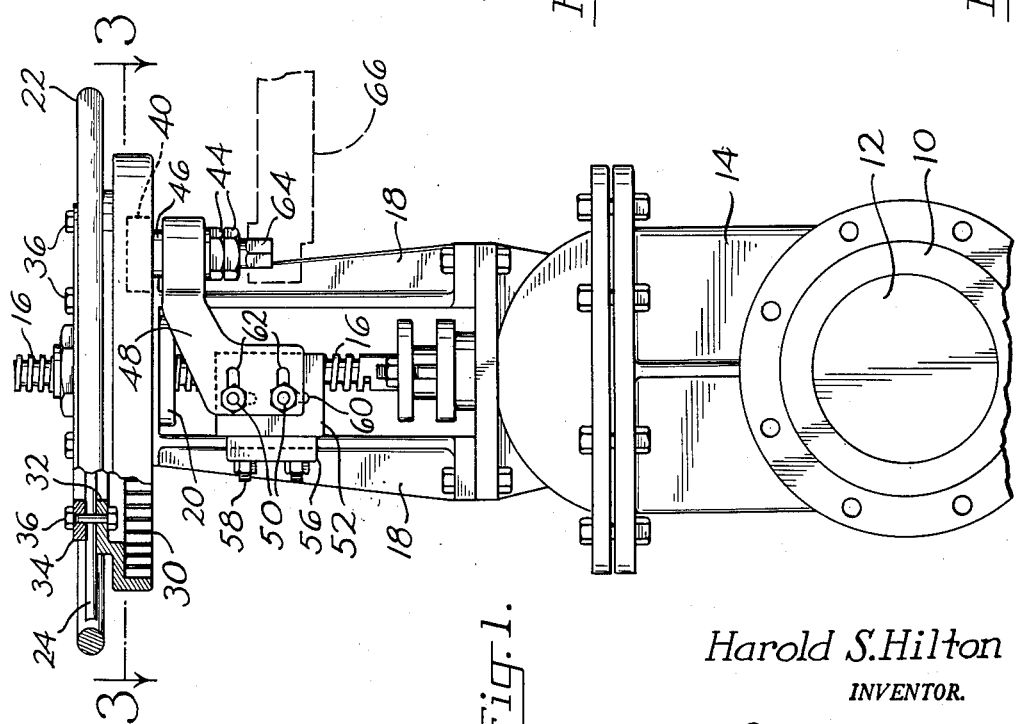
Fig. 1.
Harold S. Hilton
INVENTOR.
Agent 3,196,712
POWER DRIVE ATTACHMENT FOR FLUID
CONTROL VALVES
Harold S. Hilton, 13075 NE. 61st Place, Kirkland, Wash.
Filed Mar. 29, 1963, Ser. No. 269,103
3 Claims. (Cl. 74—625)

This invention relates to fluid control valves of the type having a gate adjustable by the manual operation of a drive screw, and more particularly to a simplified attachment for such valves which affords operation of the screw by portable power means.

There are many industrial applications which require the periodic adjustment of a multiplicity of manually operated fluid control valves, either between the extreme limits of fully open and fully closed positions, or to intermediate positions of adjustment. Such manual operation has the disadvantages of being relatively slow and thus represents a loss of production time, and of being physically taxing on the operator. Such, for example, is the case with relatively large valves employed in the production line of a pulp or paper mill, wherein considerable time and effort is involved in manually moving the valve gate through a distance of several inches or feet.

The foregoing difficulties heretofore have been overcome by installing a relatively large electric or other drive motor on each valve. However, this solution is extremely expensive and thus has been employed only to a limited extent.

Accordingly, it is the principal object of the present invention to provide, for fluid control valves of the class described, a simplified attachment by means of which the valve gate may be driven from a portable source of power, such as a conventional air or electric torque wrench.

Another object of the present invention is the provision of a drive attachment of the class described, which is of simplified construction for economical manufacture, which is adaptable for attachment to fluid control valves of various types and sizes with speed and facility, and which is capable of long and faithful operation with a minimum of maintenance and repair.

The foregoing and other objects and advantages of the present invention will appear from the following detailed description, taken in connection with the accompanying drawing in which:

FIG. 1 is a fragmentary vertical elevation of a conventional gate valve having mounted therein a power drive attachment embodying the features of the present invention, a portion of the assembly being broken away to disclose details of construction and assembly;

FIG. 2 is a plan view as viewed from the top in FIG. 1; and

FIG. 3 is a sectional view taken along the line 3—3 in FIG. 1.

For purposes of illustration, there is shown in FIG. 1 a conventional gate valve which includes a flanged coupling conduit 10 for connecting the valve into a fluid line to be controlled. A gate 12 is mounted movably in a gate housing 14 for traversing the conduit opening, to open and close the latter, and this gate is connected to the elongated screw 16 which extends outward through the gate housing. The laterally spaced arms 18, secured to the gate housing, extend outward, in the direction of the screw, and form a yoke which supports the bearing 20 concentrically about the screw. The bearing supports a manually operated hand wheel 22 for axial rotation, and constrains the hand wheel against longitudinal displacement relative to the bearing. The spokes 24 of the hand wheel support a hub 26 which is threaded for engagement with the screw 16. Accordingly, since the screw is secured to the gate and thus is constrained against axial rotation, rotation of the hand wheel effects longitudinal movement of the screw and corresponding adjustment of the attached gate.

The gate valve construction described hereinbefore is well known in the art and forms no part of the present invention, but serves merely to illustrate a typical form of valve with which the power drive attachment of the present invention may be associated.

In the embodiment illustrated, the drive attachment of the present invention includes a ring gear 30 provided with an offset annular shoulder 32 adapted to abut the underside of the spokes 24 of the hand wheel. An annular ring 34 is adapted to abut the outer surface of the spokes, and aligned openings in the ring and shoulder removably receive the attaching bolts 36 which thus clamp the ring gear firmly to the hand wheel. It will be understood, of course, that the ring gear is positioned concentrically with respect to the screw 16.

It also will be understood that the ring gear may be provided with a hub assembly similar to that of the hand wheel, so that the latter may be discarded and the ring gear mounted in its place on the bearing 20 and in threaded engagement with the screw 16.

A drive pinion 40 is adapted to be mounted in engagement with the ring gear 30. To this end the pinion drive shaft 42 is secured as by means of the lock nuts 44, in a bearing 46 mounted on the projecting end of a support arm 48 which is secured at its opposite end by means of the bolts 50, to the flange 52 of a mounting bracket 54.

The bracket 54 may be secured to the yoke arm by welding or other suitable means. In the preferred embodiment illustrated, the bracket 54 is adapted for attachment to a yoke arm 18 by means of the angle clips 56, the outer ends of which abut the bracket and the inner ends of which are adapted to overlie the projecting flanges of the yoke arm. Aligned openings in the clips and bracket receive the securing bolts 58 which, when tightened, releasably clamp the yoke arm flanges between the clips and bracket.

By this means the bracket 54 is rendered adjustable along the length of the yoke arm to effect proper positioning of the pinion 40 in the plane of the ring gear 30. The bracket flange 52 and the adjacent end of the arm 48 also preferably are provided with normally disposed slots 60 and 62, respectively, which receive the attaching bolts 50. This arrangement provides for adjustment of the arm 48 in the direction to bring the pinion into engagement with the ring gear.

The pinion drive shaft 42 projects beyond the lock nuts 44, and the exposed end of the shaft is provided with a square or other non-circular head 64 for releasable but operative connection to the correspondingly shaped rotary driving head of a conventional torque wrench or other suitable portable source of power 66. By this connection, rotation or the power source driving head causes simultaneous rotation of the pinion and ring gear. Since the latter is connected to the gate drive screw 16, through the hand wheel in the embodiment illustrated, the screw and attached gate are caused to move longitudinally. The direction of this movement may be reversed by reversing the portable drive source, as will be apparent.

A principal advantage of the present invention resides in the fact that a multiplicity of control valves, located in a given area, may be operated by a single conventional portable source of power, by providing each valve with the simplified and relatively inexpensive power drive attachment described hereinbefore. Moreover, the attachment is adaptable for use with valves of diverse types and sizes, without modification of the valve.

It will be apparent to those skilled in the art that various changes and modifications may be made in the structural details described hereinbefore without depart-

Having now described by invention and the manner in which it may be used, what I claim as new and desire to secure by Letters Patent is:

1. For use with a fluid control valve having a valve member movable in a valve body and operated by an elongated screw extending outwardly from the valve member between laterally spaced elongated arms of a yoke member projecting outwardly from the valve body, and a rotary hand wheel threaded to the outer end of the screw and mounted rotatably on the yoke: a power drive attachment comprising
    (a) a ring gear,
    (b) mounting means engaging the ring gear and adapted to engage the hand wheel for releasably securing the ring gear to the hand wheel in a position freely encircling the screw,
    (c) a pinion,
    (d) pinion support means mounting the pinion for rotation thereon and adapted for releasable attachment to one of the laterally spaced arms of the yoke member for adjustment along the length of said arm for adjusting the pinion in its axial direction relative to the yoke arm,
    (e) the support means including adjustment means for adjusting the pinion in its radial direction relative to the yoke arm,
    (f) the support means thereby affording adjustment of the pinion in its axial and radial directions relative to the yoke arm into driving engagement with the ring gear, and
    (g) connector means engaging the pinion and adapted for releasable connection to a portable source of rotary power.

2. The attachment of claim 1 wherein the pinion support means comprises
    (a) a pinion support arm mounting the pinion for rotation at one end of the arm,
    (b) a mounting bracket,
    (c) attaching means engaging the bracket and adapted to engage one of the laterally spaced arms for securing the bracket to the arm adjustably along the length of the arm, and
    (d) securing means interengaging the mounting bracket and the end of the support arm opposite the end mounting the pinion for securing the support arm to the bracket adjustably in the direction substantially normal to the rotational axis of the pinion.

3. The attachment of claim 1 wherein the hand wheel includes circumferentially spaced radial spokes, and the mounting means comprises a clamp ring overlying the spokes on the side of the latter opposite the ring gear, and clamp screws extending between the spokes and interconnecting the clamp ring and ring gear.

References Cited by the Examiner
UNITED STATES PATENTS 3,063,307  11/62  Stvan _____ 74—625

DON A. WAITE, *Primary Examiner.*